Feb. 8, 1927.
E. L. WILSON
1,616,523
SHOCK ABSORBER
Filed Nov. 2, 1922
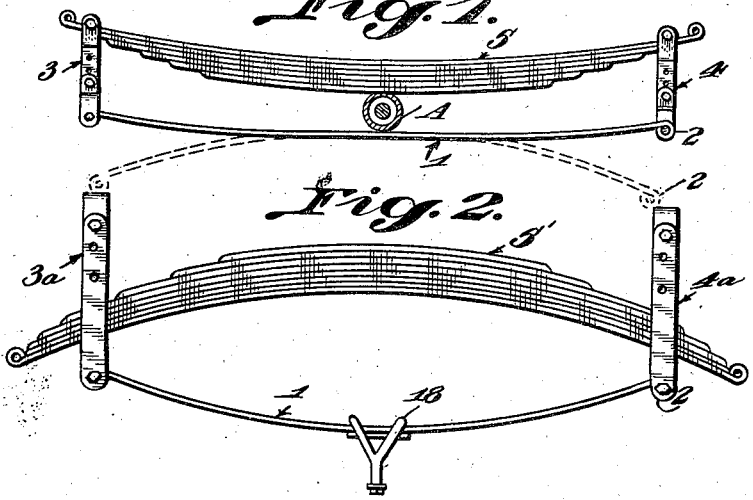
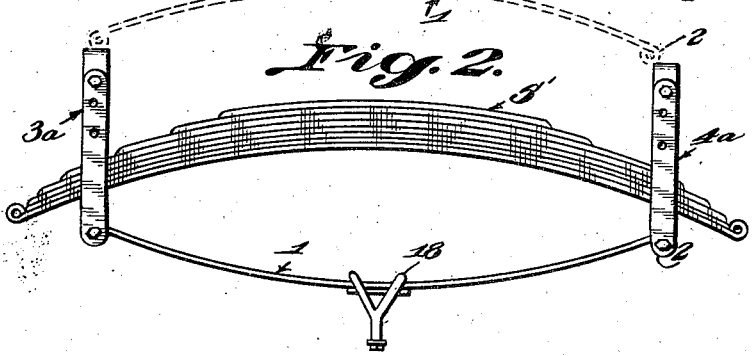
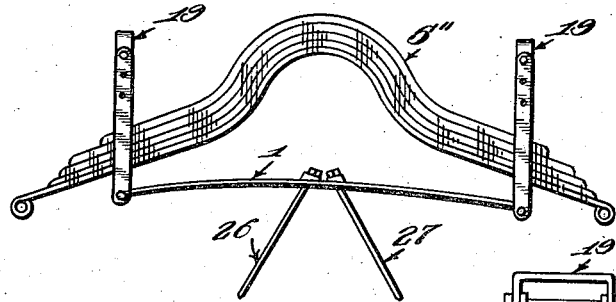
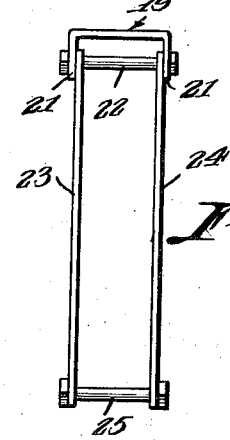
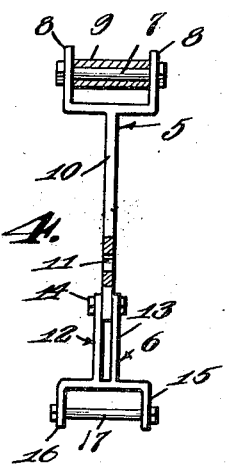
E. L. Wilson, Inventor
By C. A. Snow & Co.
Attorneys Patented Feb. 8, 1927.

1,616,523

UNITED STATES PATENT OFFICE.

EVERETT L. WILSON, OF OKEMAH, OKLAHOMA.

SHOCK ABSORBER.

Application filed November 2, 1922. Serial No. 598,550.

This invention relates to shock absorbers for automobiles.

The object of the invention is to provide a simple and efficient device of this character which may be easily applied to or removed from a car by an unskilled workman without in any way defacing the car.

Another object is to provide a shock absorber which may be used in connection with either over or under slung springs and which operates to a great extent to hold the car spring in its normal position on ordinary roads, thereby eliminating the rebound of the car spring.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a vehicle spring with this improved absorber applied, the axle of the vehicle being shown in cross section.

Fig. 2 is a front elevation of the front spring of a Ford car with this improved shock absorber shown applied.

Fig. 3 is a rear elevation of the rear spring of a Ford car with this improved shock absorber shown applied.

Fig. 4 is a detail elevation of one of the shackles used in connecting the absorber spring to its support, and Fig. 5 is a similar view of another form of shackle.

In the embodiment illustrated in Fig. 1, an under slung vehicle spring S is shown of ordinary construction in connection with which the absorber 1 constituting this invention is shown applied. This absorber 1 is made in the form of a leaf spring having bearings 2 at its ends for the connection therewith of shackles 3 and 4. These shackles are exactly alike and one of them is shown in detail in Fig. 4. These shackles each comprises two members 5 and 6 adjustably connected, the member 5 being shown connected with the spring S while the member 6 is carried by the end of spring 1. The member 5 is made substantially Y-shaped in form with a bolt 7 connecting the arms 8 thereof and on which is mounted a roller 9 between the arms, said roller being designed to travel on the upper leaf of the spring S. The stem or shank 10 of the member 5 is provided at its free end with a plurality of longitudinally spaced apertures 11 for adjustable connection with the stem 12 of the member 6 as is shown clearly in Fig. 4. This stem 12 is made bifurcated and the furcations 13 thereof straddle the stem 10 and are connected therewith by a bolt 14. This member 6 is also substantially Y-shaped in form and the head 15 thereof has its arms 16 connected by a bolt 17, said arms being designed to straddle the bearing 2 of the absorber spring 1, while the bolt 17 extends through said bearing and thus connects the shackle member 6 with the spring 1

In the use of this form, the spring 1 constituting the absorber is positioned below the axle A with its ends connected by the shackles 3 and 4 with the spring S, the rollers 9 carried by said shackles being designed to travel on said spring. The spring 1 in normal position before placed under tension, assumes the position shown in dotted lines in Fig. 1, and this is the position said spring would assume when relaxed, should it be released from the shackles.

From the above description it will be obvious that when the spring 1 is mounted as shown in Fig. 1, it will operate to hold the car spring S in its normal position to a great extent and thus will prevent the rebound of this spring S and thereby protect the occupants of the vehicle against shocks.

It will be obvious from the above description and reference to Fig. 1 that this absorber 1 may be readily applied to the spring S by an unskilled workman, and that its application will not in any way deface the car.

In the form shown in Fig. 2, the absorber spring 1 which is the same as that shown in Fig. 1 is connected intermediate its ends with the front axle of the car, not shown, any suitable means being employed for this purpose, a hanger or clamp being here shown.

The shackles used in connecting the absorber 1 in the form shown in Fig. 2 differ from those used in the form shown in Fig. 1 and the form of hanger employed in this construction is illustrated in detail in Fig. 5. These hangers 3ª and 4ª which are connected with the respective ends of the spring 1 are designed to be suspended from the chassis of the car, not shown, and which comprises a U-shaped member 19 through the arms 20 and 21 of which passes a bolt 22 on which is mounted between said arms links or bars 23 and 24. This U-shaped member 19 is designed to straddle the support on which the shackle is to be mounted, while the links 23 and 24 straddle one end of the spring S′ as is shown clearly in Fig. 2. These links are connected at their lower ends by a bolt 25 which also passes through the bearing at one end of the spring 1 thus uniting the shackle with the spring locating the spring directly below the vehicle spring.

It will thus be seen that the absorber 1 being connected with the axle of the vehicle will operate to absorb the shocks received by the wheels passing over obstructions and when straightened out to a certain extent, the bolts 25 will engage the lower faces of the spring S′.

In the form shown in Fig. 3, the same shackles are employed as are illustrated in Fig. 2, the only difference being that the spring 1 instead of being connected intermediate its ends with the front axle of the car is designed to be connected by the hangers 26 and 27 with the differential housing at the rear of the car.

In the form shown in Fig. 3, the members 19 of the shackles are designed to be engaged with the chassis of the vehicle, thereby connecting the absorber spring 1 with the chassis as well as with the rear axle. It is of course understood that this absorber may be used on other forms of vehicle than a Ford car, the embodiment herein illustrated constituting merely one application of the invention.

I claim:—

The combination with a vehicle spring; of an auxiliary spring in the form of a leaf spring having bearings at its ends; shackles connected with said bearings and each composed of two Y-shaped members having their shanks arranged end to end and adjustably connected; the shank of one being bifurcated to receive the shank of the other, the shank received having a plurality of longitudinally spaced apertures to provide for its adjustment relatively to the other member, bolts connecting the arms of each of said members to adapt them for connection respectively with the bearings of the auxiliary spring and with the main spring.

In testimony that I claim the foregoing as my own, I have hereto affixed my signature.

EVERETT L. WILSON.